United States Patent [19]

Vogel et al.

[11] 4,312,052
[45] Jan. 19, 1982

[54] METHOD FOR IDENTIFYING WEAK SANDS

[75] Inventors: Charles B. Vogel, Houston; Robert A. Herolz, Willis, both of Tex.

[73] Assignee: Shell Oil Company, Houston, Tex.

[21] Appl. No.: 141,835

[22] Filed: Apr. 21, 1980

[51] Int. Cl.³ .................... G01V 1/047; G01V 1/053; G01V 1/40

[52] U.S. Cl. .................... 367/75; 367/912; 181/104; 181/401

[58] Field of Search .................... 367/31, 75, 165, 180, 367/912; 181/104, 106, 401; 73/644, 628, 597; 29/594; 310/333

[56] References Cited

U.S. PATENT DOCUMENTS

| | | | |
|---|---|---|---|
| 2,525,861 | 10/1950 | Carlin | 73/644 |
| 2,784,325 | 3/1957 | Halliday et al. | 73/628 |
| 2,943,694 | 7/1965 | Goodman | 367/75 |
| 3,542,150 | 11/1976 | Youmans | 101/104 |
| 3,720,098 | 3/1973 | Dixon | 73/597 |
| 3,775,739 | 11/1973 | Vogel | 367/75 |
| 3,883,841 | 5/1975 | Norel et al. | 367/917 |
| 3,949,352 | 4/1976 | Vogel | 367/75 |
| 3,973,152 | 8/1976 | Korglus | 310/335 |

FOREIGN PATENT DOCUMENTS 2321709 8/1975 France .................... 367/75
681401 3/1976 U.S.S.R. .................... 181/401

OTHER PUBLICATIONS

Evans, "Seismic Model Experiments with Shear Waves", pp. 40-48, Geophysics, vol. 24, #1, 2/59.

Primary Examiner—Nelson Moskowitz

[57] ABSTRACT

A method and apparatus for obtaining improved measurements of shear waves in low-velocity lossy formations surrounding a borehole. The method comprises forming an interface between the borehole wall and a solid homogeneous material having a lower velocity than the formation. The geometry and velocity of the homogeneous material provide enhancement of the shear waves at the interface and thereby minimize the effect of interference from undesired compressional waves. Further improvement is obtained by using shear waves whose particles move perpendicular to the travel of the wave, parallel to the plane of the waves and perpendicular to the surface of the material. These are commonly referred to as SV shear waves.

9 Claims, 4 Drawing Figures

METHOD FOR IDENTIFYING WEAK SANDS

BACKGROUND OF THE INVENTION

The present invention relates to a method for logging formations penetrated by boreholes and particularly, a method for acoustically detecting the characteristics of formations having relatively low acoustical velocities and high acoustical losses. These formations normally comprise weak sand structures. As is well known, considerable quantities of both crude and natural gas are found in sand structures. Thus, the location and type of sand structures penetrated by a borehole is important.

In addition, the location of weak sand structures is important if they contain commercial quantities of petroleum products. If commercial quantities are located in weak sand structures and their character and location is known, steps can be taken before completing the well to stabilize the sand structures. If weak sands are not stabilized, they will tend to flow into the well when it is produced and thus, clog the well and either completely stop or diminish production. While it is possible to consolidate weak sands after the well is completed, superior results are obtained if they are consolidated prior to casing the well.

One method that has been suggested for locating weak sands in formations penetrated by a borehole is the use of an acoustical logger. The method consists of using an acoustical logger and measuring the response of the formation to compressional waves. In the presence of weak sands, the travel time of the compressional waves is increased due to the lower acoustical velocity of the sands. The increased travel time can be used as an indication of weak sands. While this approach has some success, it often times fails since the decrease in velocity of the compressional waves in weak sands is usually small and affected by other variables such as the presence of clay.

In an attempt to overcome the problems of conventional acoustic loggers it has been suggested that the velocity of shear waves be measured. This has some success where formation velocities are high, i.e., greater than 10,000 feet per second. For lower velocity formations the shear wave event is obscured by the earlier arriving compressional waves. In cases where the shear wave velocity in the formation is exceeded by the compressional wave velocity through the borehole fluid the method fails completely. This failure is the result of the inability to generate shear waves in the formation under these conditions using conventional methods.

Some success has also been obtained by measuring shear wave velocities in core samples. This requires expensive coring operations to obtain the cores since low velocity formations are really incompetent and tend to fall apart when cored. Further problems arise when measurements of shear wave velocities are made since it is difficult to couple the transducers to the core.

BRIEF SUMMARY OF THE INVENTION

The present invention provides a method for acoustically logging formations penetrated by the borehole to locate weak sands. The method consists of a means for launching SV shear waves of substantial amplitude along the borehole wall and detecting their arrival at a spaced location. By measuring the travel time or amplitude of the detected SV shear waves, the location of weak sands can be determined. In almost all cases of weak sands, the velocity of SV shear waves is much lower than the velocity of the compressional waves in the borehole fluid. Thus, the SV shear waves arrive after the arrival of compressional waves and can be detected if properly enhanced.

Reliable shear wave measurements have not generally been available in the past in low velocity formations because of the aforementioned compressional waves. In the present invention, the effect of compressional waves is minimized by coupling a conformable pad firmly to the borehole wall and inducing SV shear waves in the pad.

The method provides a means for launching the SV shear waves along the borehole wall. The method utilizes the refraction of shear waves at a solid-solid interface between the pad and the borehole wall extending over a portion of the wall. The solid-solid interface can be achieved by pressing a conformable mass of material firmly against the borehole wall and producing SV shear waves in the material. SV shear waves produced in the mass of material will refract at the solid-solid interface and travel along the borehole wall. The SV shear waves can be detected by placing a second mass of material against the borehole wall to form a second solid-solid interface. Of course, the same mass may extend completely over the measurement interval if desired. The detected SV shear waves can be used to determine the travel time of the shear waves over the distance between the location of the production and detection of the SV shear waves or the amplitude of an identifiable portion of the detected shear waves can be displayed. In all cases, the distance between production and detection of SV shear waves should exceed the wave length of SV shear waves in the formation of interest.

BRIEF DESCRIPTION OF THE DRAWINGS

The present invention wil be more easily understood by the following detailed description of the preferred embodiment when taken in conjunction with the attached drawings in which.

DESCRIPTION OF A PREFERRED EMBODIMENT

Experiments have been established that an acoustic wave obliquely incident upon a sample of solid material will generate at the surface a shear wave. The shear wave will propagate along the surface at a velocity lower than the bulk shear velocity of the material. By using properly placed transmitting and receiving transducers the SV shear wave velocity may be measured. When the material is immersed in a liquid, as is the case of material surrounding a borehole, the above procedure will only operate when the shear velocity of the material is high, i.e., greater than 4500 feet per second.

It has been discovered that a substantial improvement can be obtained in the amplitude of the SV shear wave by employing a solid mass to couple the transducers to the sample. The mass should have a shear velocity less than the compressional velocity of the liquid in which the sample is immersed. Excellent results are obtained by using low velocity mass and attaching linear shear transducers to the masses. The transducers are oriented to produce and receive SV shear waves that are propagated along the surface of a sample. It has been found helpful to position an acoustic absorber between the masses where the sample is immersed in a liquid.

Figure 1:
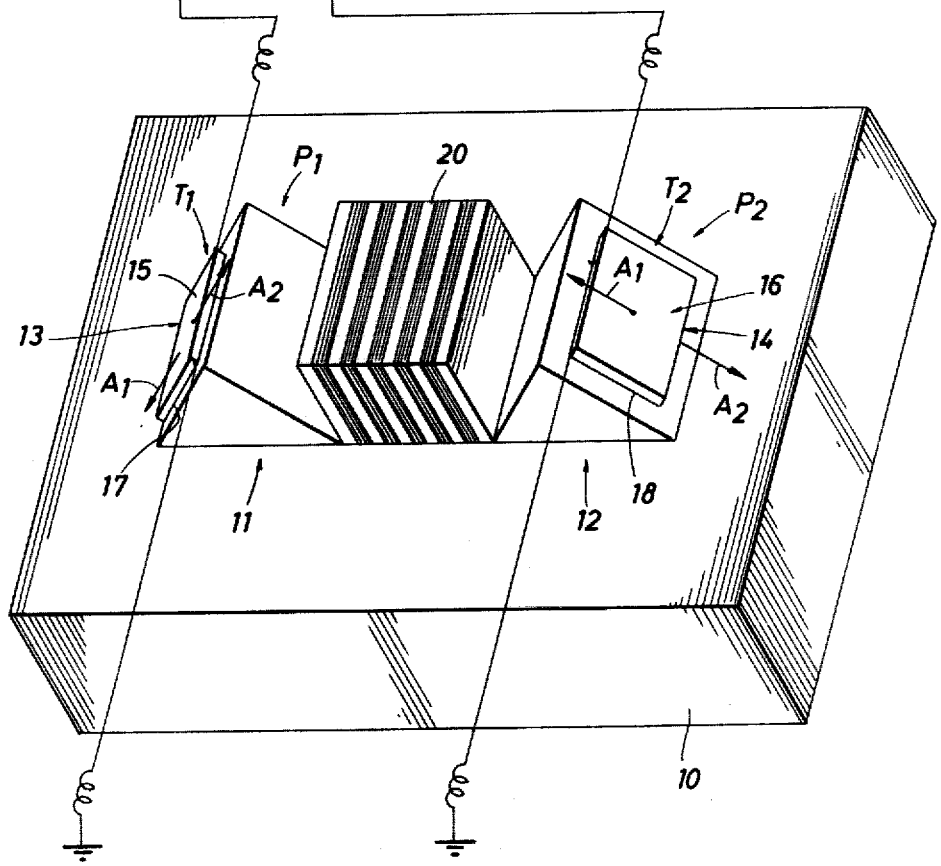
FIG. 1 is an illustration of the invention used to measure shear waves in a sample.

Referring now to FIG. 1, there is shown one means for carrying out the method for the present invention. Illustrated in FIG. 1 is a sample of low-velocity material 10 which may comprise a sample of unconsolidated sand, for example Berea sandstone having overall dimensions of 10×12×4 inches. The two transducer assemblies 11 and 12 are mounted on the upper surface of the low-velocity material. Each assembly is formed of a conformable, homogeneous material in the form of a triangular prism. In addition to being homogeneous or uniform material, the material of the prisms must be capable of conforming to the surface of the sample and have a low velocity for acoustical waves preferably lower than the low-velocity material 10. A suitable material would be cadmium or a thermoplastic such as nylon. Attached to each prism is a flat linear shear transducer as at 13 and 14 that may be one inch square and have a resonance of 0.2 MHz. The transducers have silver electrodes 15-18 disposed on their flat surfaces. Disposed between the two transducer assemblies is an acoustical absorber 20 that may be formed of alternate layers of copper and neoprene. Connected to the electrodes of one transducer is a pulse source 21 while the other transducer is coupled to Y axis of a cathode ray tube 22. The sweep of cathode ray tube 22 is controlled by the pulse source 21. A filter 23 is used to remove the low frequency noise and high frequency compressional waves produced at the edges of transducer 13.

In operating the system shown in FIG. 1 the pulse source 21 excites the transducer 13 which acts as a transmitter to produce shear waves such that the larger surfaces of the transducers move in the directions indicated by the arrows A 1, A 2 of FIG. 1. The shear waves produced by the transmitter travel through the prism 11 along the surface of the sample to the receiving prism 12 and the receiving transducer 14. Acoustic absorber 20 absorbs any sound which may be transmitted to the liquid in which the sample and transducers are submerged and also provides a low velocity boundary at the surface of the sample. The signals produced in the receiving transducer 14 as a result of the arrival of the shear waves are displayed on the cathode ray tube 22. In particular, the signals are filtered by the band pass filter 23 to reject the signals outside a frequency range of, for exmple, 2000 to 25000 Hz. This frequency band is above the noise and below the compressional wave frequencies generated by the transducers. It thus contains the major portion of the energy of shear waves of interest.

Figure 2:
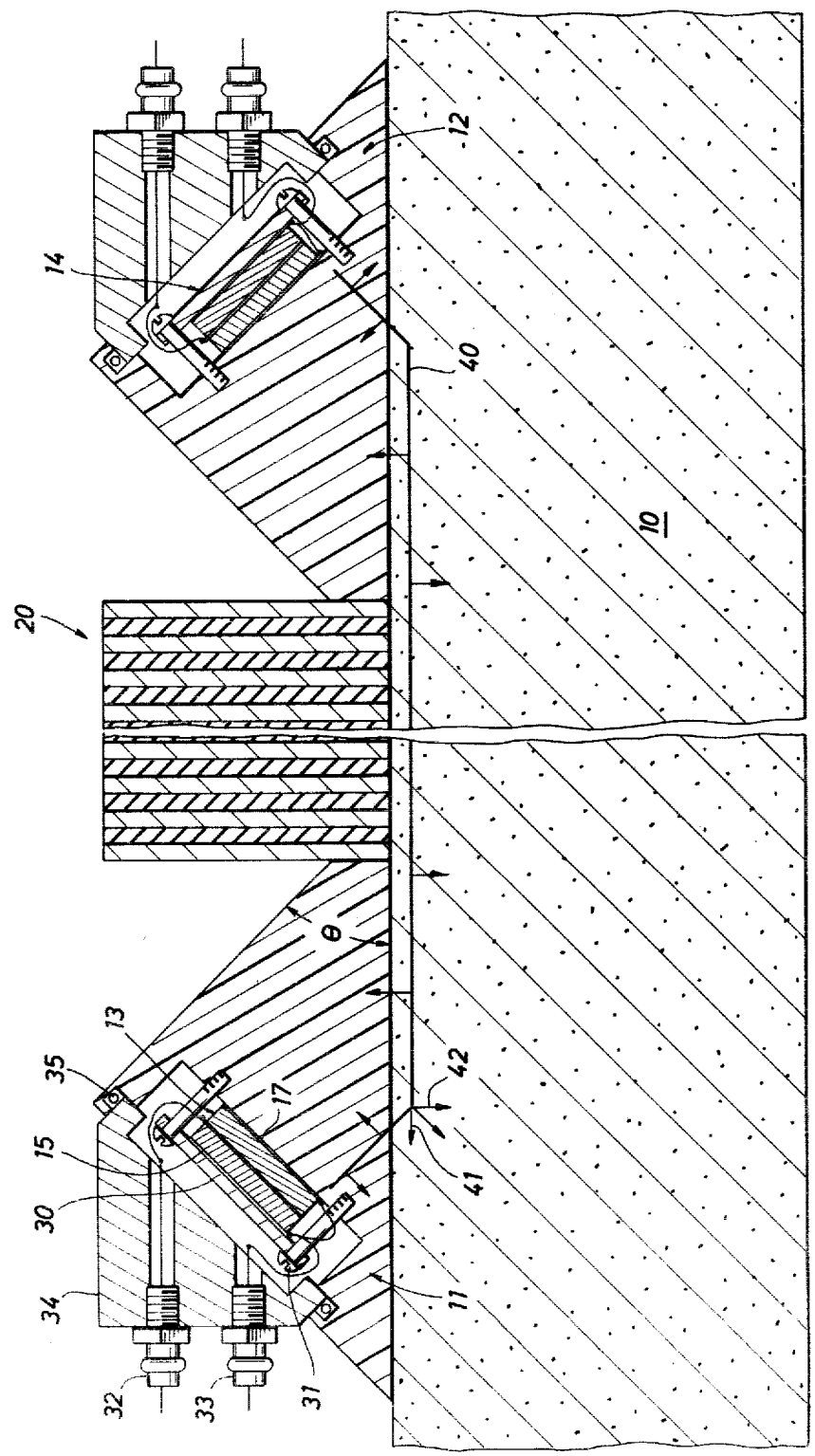
FIG. 2 is a vertical section along line II—II of FIG. 1.

Referring now to FIG. 2, there is shown a vertical cross section of the apparatus shown in FIG. 1 including details of the transducers. In particular, the transducer 13 comprises two piezoelectric crystals with electrodes disposed on the top and bottom and between the common surfaces of the two crystals. The top and bottom electrodes are coupled together and to an electrode 33 while the center electrode is coupled to the electrode 32. Electrodes 32 and 33 are disposed in a housing 34 which is sealed in the opening in the prism by means of the O ring 35. Small screws 31 are used to normally clamp the crystals together and to the surface of the prism 11.

As shown, the SV shear wave travels along a path 40 through the prism 11, the sample 10 and back through the prism 12 to the transducer 14. Small arrows on the path 40 illustrate the movement of the shear waves in the prism and the sample. As seen at the left, the shear waves on entering the sample 10 have a horizontal component 41 and a vertical component 42. The magnitude of the components will depend upon the angle $\theta$ which is defined by Snell's Law.

$$\sin\left(\frac{\pi}{2} - \theta\right) = V_s \text{ prism}/V_s \text{ sample}$$

In the above equation the $V_s$ sample is the shear wave velocity of the sample. In an ideal case $\theta$ would be equal to 45° in which case the shear wave velocity of the prism would equal 0.707 of the shear wave velocity of the sample. Under these conditions the vertical component 42 of the shear wave will have a substantial fraction of the total shear wave energy.

In the above description of the apparatus and the path of the SV shear wave through the sample, it is seen that particle motion at the surface of the sample is perpendicular thereto. Since the particle motion is perpendicular to the surface, the coupling between the prism and the surface does not depend upon friction and thus does not require intimate contact between the prism and the surface. This allows effective coupling of the high frequency SV shear wave to the surface of the sample even though a layer of liquid or borehold mudcake may exist between the prism and the sample.

The amplitude of the SV shear wave is also enhanced by the velocity filtering effected by the finite velocity of advancement of the shear wave along the sample-prism interface. It has been shown by experiments that the SV shear wave pulse which reaches the receiving transducer 12 will have a maximum amplitude when the velocity of advancement along the interface equals approximately the shear velocity of the sample material. While it is normally difficult to obtain an exact match between the velocities, it is not necessary that exact equality be obtained. In general, it would be preferable that the shear wave velocity in the prism be less than the shear wave velocity in the sample.

The use of the filter described above rejects both the low frequency noise as well as the high frequency compressional waves produced by the transmitting transducer. Compressional waves result from the fact that the transmitting transducer acts not only as a shear wave dipole source but also as a pair of weak compressional waves, oppositely phased, dipole sources. The transducer edges are separated approximately one inch and therefore at sufficiently low frequencies will be ineffective. From the above described experiments, the rejections of frequencies about 25 kHz sufficiently filters the compressional wave so as not to affect the shear wave measurements.

In a practical design of an operational apparatus it is desirable to make certain compromises so that the apparatus can be constructed while obtaining useful measurements over a fairly wide range of velocities. It has been found desirable to construct the prisms of a material known as nylon 101 which is marketed by the DuPont Company. This material has a reciprocal shear velocity which is nearly equal to that expected in the slowest earth material likely to be measured. Also, the angle θ of the prisms has been made 45° which has proven to be desirable for general use.

Of course, it is also necessary to orient the shear transducers so that they are directional and produce shear waves in the prism that are incident on the sample surface at an angle. Likewise, as explained above, the shear velocity of the prism should be less than the velocity of any fluid in which the apparatus is immersed. Even though this latter condition is observed, it is still desirable to use the acoustic absorber disposed between the prisms when the sample is immersed in a liquid.

Figure 3:
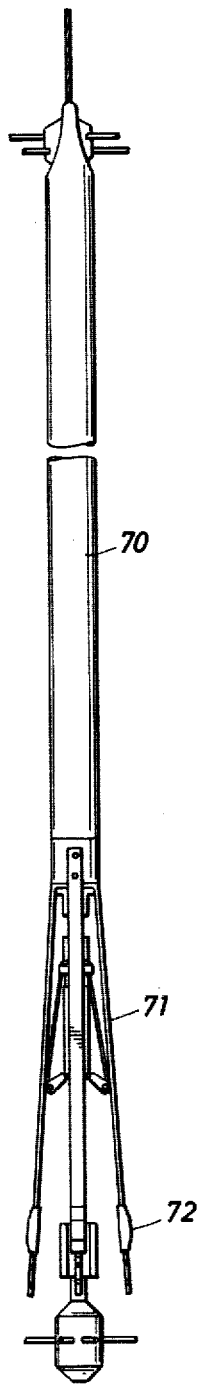
FIG. 3 is an elevation view of a logging tool incorporating the invention.
Figure 4:
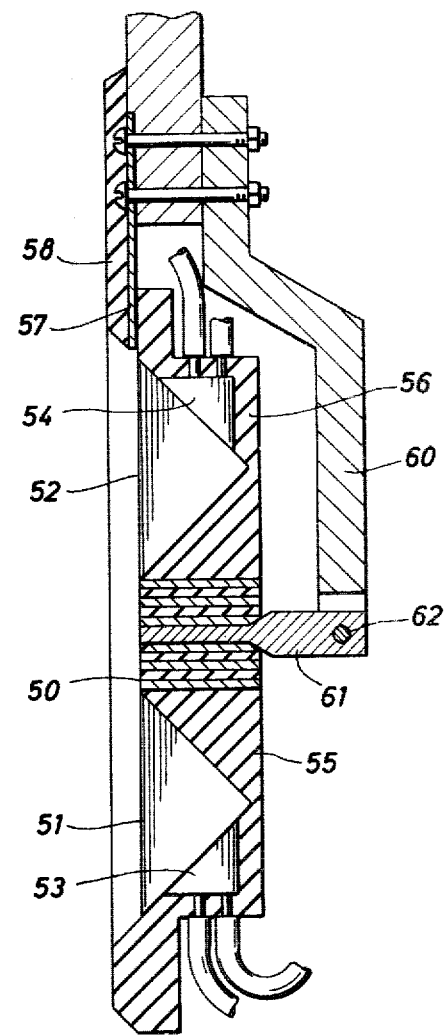
FIG. 4 is an enlarged vertical section of the transducer assembly of FIG. 3.

Referring now to FIGS. 3 and 4, there is shown the apparatus of FIGS. 1 and 2 adapted for use in a borehole logging tool. In particular, FIG. 3 illustrates a borehole logging tool substantially the same as that disclosed in U.S. Pat. No. 4,130,816 except for the substitution of the transducer prism arrangement of FIG. 1 for the transducers shown in the patent. In particular, the transducers are substituted in the pad arrangements 72 which are attached to the arms 71 of the logging tool disclosed in the patent. The electronics for the tool is included in the housing 70 of the tool.

The details of the transducer prism arrangement are shown to an enlarged scale in FIG. 4. In particular, the acoustic absorber 50 is mounted or secured to an arm 61. The arm 61 is pivoted about pin 62 which is supported by a support member 60 attached to the lower end of the arm 71. The two prisms 51 and 52 are mounted on either side of the acoustic absorber with the transducers being mounted in the pockets 53 and 54 formed in the prism housings 55 and 56. Housings 55 and 56 are preferably molded of neoprene rubber and are secured to the absorber 50. The prisms and transducers are substantially the same as those shown in FIGS. 1 and 2. Neoprene housings 55 and 56 are attached to a soft spring 57 which is secured to the lower end of the arms of the logging tool as shown. A soft neoprene covering 58 is provided over the ends of the arms as an absorber to reduce the noise generated by the arms dragging against the wall of the borehole.

While the transducer mountings shown in FIGS. 3 and 4 are for measuring shear wave velocities in a vertical direction, it is also possible to orient the transducer so that one can measure shear wave velocities in a horizontal direction. It may be desirable when measuring horizontal shear wave velocities to include more than the four arms shown in FIG. 3 so that more complete coverage of the surface of the borehole would be obtained.

What is claimed is:

1. An apparatus for measuring characteristics of SV shear waves in an earth material comprising:

a pair of prisms formed of a low shear velocity material, said prisms being disposed on a flat surface of said earth material in spaced positions;

a transducer mounted on each prism, one of said transducers being mounted to produce SV shear waves in one of said prisms and the other transducer being mounted to receive the SV shear waves;

filter means coupled to said other transducer to reject low frequency noise and high frequency compressional waves; and recording means coupled to said filter to record the SV shear waves received by said other transducer.

2. The apparatus of claim 1 wherein said prisms form approximately a 45° angle with said flat surface.

3. The apparatus of claim 1 or 2 wherein the shear velocity of said prisms is approximately equal to or less than the velocity of the earth material.

4. The apparatus of claim 1 wherein an acoustic absorber is disposed between said prisms.

5. The apparatus of claim 1 wherein said filter passes a band of frequencies between 2000 and 25000 Hz and rejects other frequencies.

6. A logging tool sonde having a plurality of flexible elongated arms extending along the axis of said sonde and means for extending and retracting said arms, said sonde in addition having:

a plurality of prisms formed of a low shear velocity material, a pair of said prisms being mounted on each of said arms for movement into contact with the earth when said arms are extended;

a transducer mounted on each of said prisms, one of said transducers being mounted to produce SV shear waves in one prism of each pair, another of said transducers being mounted on the other prism of each pair to receive SV shear waves;

filter means coupled to said other transducer to reject low frequency noise and high frequency compressional waves; and, recording means coupled to said filter to record the SV shear waves received by said other transducer.

7. The logging tool sonde of claim 6 wherein said prisms are triangular prisms that are oriented to form approximately a 45° angle with the wall of the borehole in which sonde is lowered when said arms are extended and the prisms contact the wall.

8. The logging tool sonde of claims 6 or 7 and in addition an acoustic absorber disposed between each pair of prisms.

9. The logging tool sonde of claim 7 wherein said transducers are flat transducers having their flat surface in contact with a surface of the prism whereby they produce and receive SV shear waves in said prisms.

* * * * *